L. H. PARKER.
SPRAYING DEVICE.
APPLICATION FILED AUG. 20, 1915.
1,186,226.
Patented June 6, 1916.
3 SHEETS—SHEET 1.
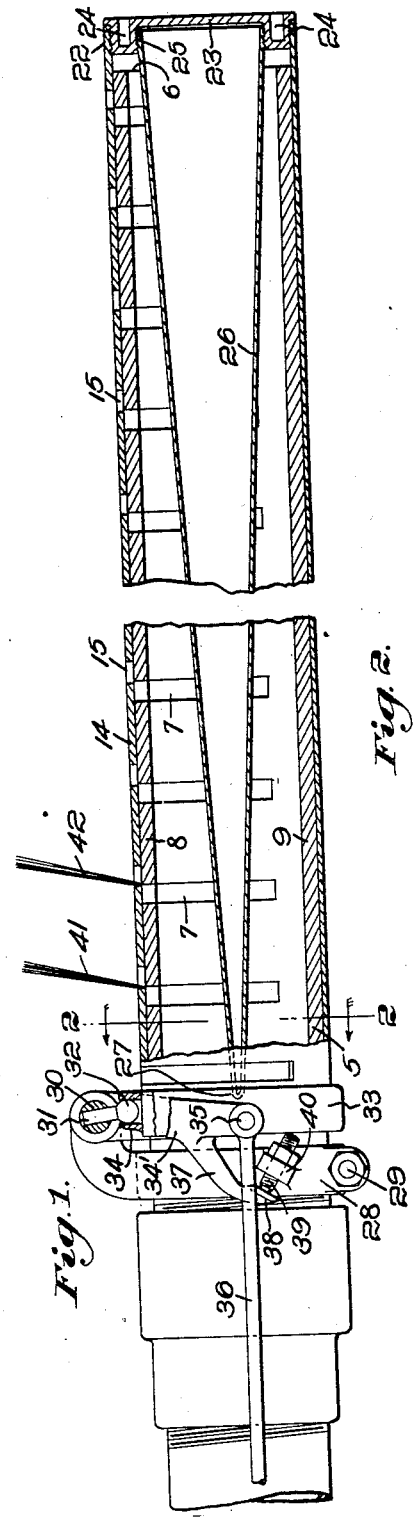
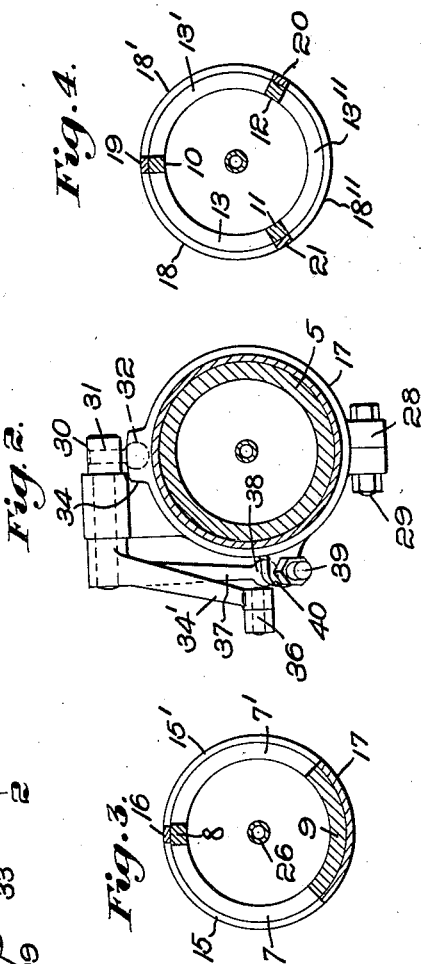
Inventor:
Lee H. Parker,

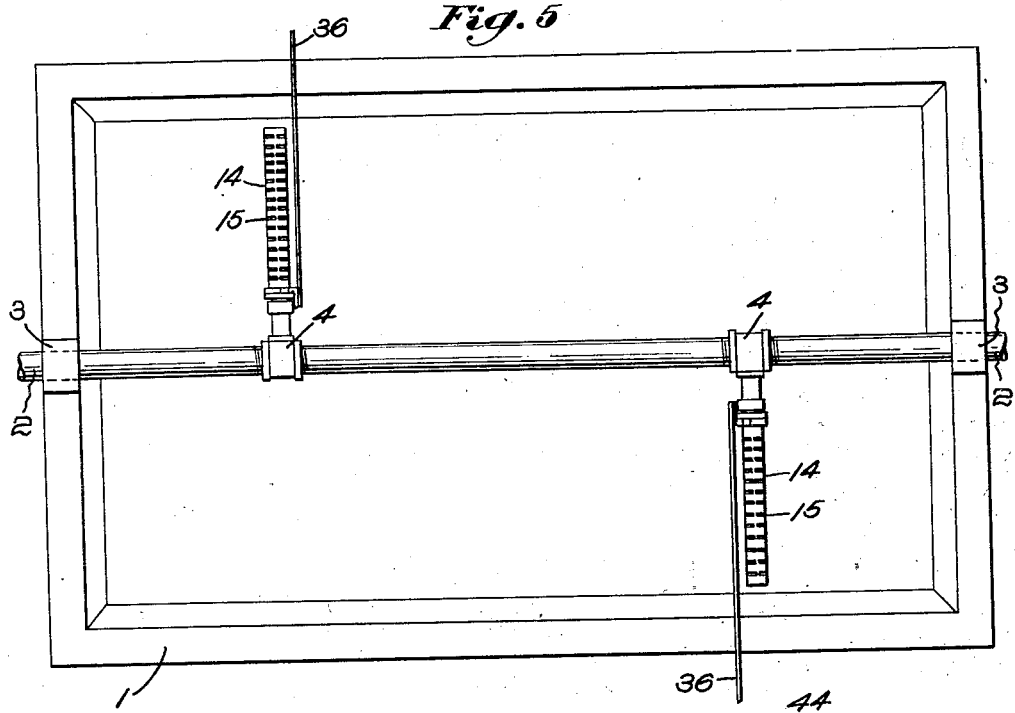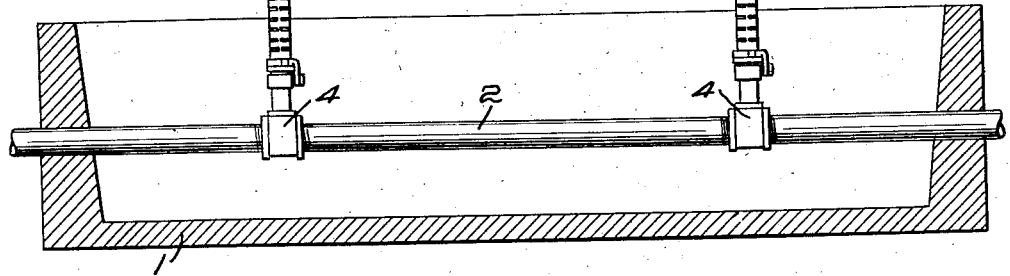

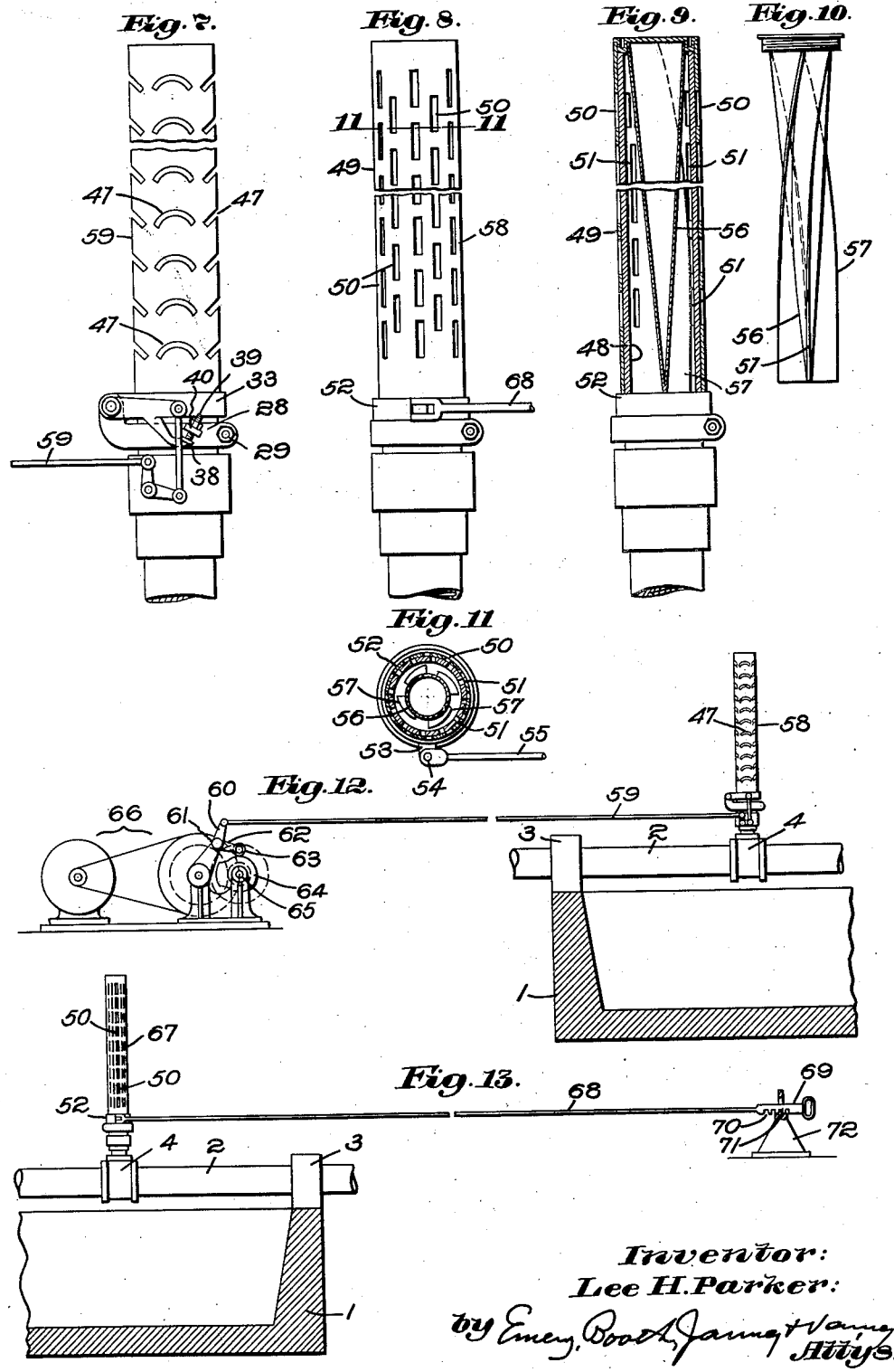

UNITED STATES PATENT OFFICE.

LEE H. PARKER, OF BROOKLINE, MASSACHUSETTS, ASSIGNOR TO SPRAY ENGINEERING COMPANY, OF BOSTON, MASSACHUSETTS, A CORPORATION OF MAINE.

SPRAYING DEVICE.

1,186,226.  Specification of Letters Patent.  Patented June 6, 1916.

Application filed August 20, 1915. Serial No. 46,548.

*To all whom it may concern:*

Be it known that I, LEE H. PARKER, a citizen of the United States, and a resident of Brookline, in the county of Norfolk and State of Massachusetts, have invented an Improvement in Spraying Devices, of which the following description, in connection with the accompanying drawings, is a specification, like characters on the drawings representing like parts.

This invention relates to spraying devices capable of use in different relations, but particularly intended for spraying water in cooling ponds pertaining to manufacturing plants.

In order that the principle of the invention may be readily understood, I have disclosed a single embodiment thereof, in the accompanying drawings, wherein—

Figure 1 is a view partially in side elevation and partially in vertical longitudinal section of a liquid spraying device constructed in accordance with my invention; Fig. 2 is a vertical cross section thereof upon the line 2—2 of Fig. 1; Fig. 3 is a vertical cross section taken through a slotted portion of the inner and outer tubes; Fig. 4 is a similar view of a slightly modified form of the invention; Fig. 5 is a plan view of a cooling pond having a plurality of spraying devices supported in horizontal position thereover; Fig. 6 represents a cooling pond in vertical, longitudinal section and a plurality of spraying devices supported in vertical position with respect thereto; Fig. 7 represents in side elevation a somewhat modified form of the invention; Fig. 8 is a similar view of a still further modified form of the invention; Fig. 9 is a view, mainly in vertical central section, of the construction shown in Fig. 8; Fig. 10 is a view in side elevation of the inner cone shown in Fig. 9; Fig. 11 is a view in cross section upon the line 11—11 of Fig. 8; Fig. 12 is a view, mainly in side elevation, of one form of means for automatically flushing the spraying devices; and Fig. 13 is a similar view of one form of means for manually flushing the same.

Cooling ponds receiving water of condensation in a necessarily highly heated condition are utilized by manufacturing plants. In order to cool the water in such ponds, spraying devices have been provided which receive the heated water from the ponds through pumps or otherwise and discharge the water into the air to fall again into the ponds, the water being thus subjected to the cooling contact with air currents. While the spraying device herein disclosed is capable of use in other relations, it is peculiarly adapted for use in connection with a cooling pond, and I so describe it with reference to such use without, however, limiting it in any sense thereto.

Referring more particularly to the drawings, I have in Figs. 5 and 6, represented a cooling pond at 1. In Fig. 5, I have represented a distributing pipe 2 mounted in suitable supports 3 upon or within the confines of the pond. One or more spraying devices may be used in connection with each pond, depending upon the capacity of the spraying device and the area of the pond. In Fig. 5, I have represented the pipe 2 as having two couplings 4—4, to which are connected inner tubes 5, one of which is clearly shown in Figs. 1, 2 and 3. Said inner tube 5 is suitably connected to the appropriate coupling 4 in any manner not herein necessary more fully to describe. Preferably said inner tube is made of brass or other suitable metal, and is preferably of considerable length. It is herein represented as tubular in form and as having an open outer end 6. It is provided with discharge openings, preferably in the form of segmental slots 7. In Fig. 3, I have represented said inner tube as having two slots 7, 7' in circumferential alinement, this construction being repeated throughout the series of slots. The said slots are formed by sawing or cutting the material of the tube. In the form of the invention shown in Fig. 3, the tube is left uncut at the portions 8, 9, the latter being of greater circumferential extent and suitably strengthening the tube and preventing deformation thereof. If desired, I may cut away the inner tube circumferentially excepting at the points 10, 11 and 12, as indicated in Fig. 4, thus providing segmental slots 13, 13′ 13″. The slots may be otherwise formed within the scope and purpose of the invention.

The outer tube, which is also preferably of brass or other suitable metal, is represented at 14, it being provided with corresponding slots 15, preferably of equal width. While the extent of the slots of the outer tube may be varied, I preferably form the same of the same length as those of the inner tube, and in Fig. 3, I have represented slots 15, 15′ corresponding in length to the slots 7, 7′ of the inner tube, the material of the outer tube remaining uncut at the points 16, 17.

In Fig. 4, I have represented three circumferentially alined slots 18, 18′, 18″ corresponding in length to the slots 13, 13′, 13″, the material of the outer tube being left uncut at the points 19, 20, 21.

Within the scope of my invention, relative movement in any suitable direction may be imparted to said tubes in order to bring the discharge openings more or less into register. Preferably I impart longitudinal sliding movement to one of said tubes for this purpose, and I have herein represented the outer tube 14 as having sliding movement upon the inner tube. The inner tube 5 has an open end 6, but the outer tube 14 is internally threaded at its outer end 22 for the reception of an externally threaded cap piece 23 provided with sockets 24 for the application of a spanner or other device. The said cap piece 23 is internally threaded as represented at 25 for the reception of a pressure and discharge equalizing cone 26, which, in the disclosed embodiment of the invention, extends substantially to the entrance end of the inner tube at the point 27. By progressively decreasing the effective cross sectional area of the inner tube at points successively more remote from the point of supply, the pressure of the liquid and the discharge thereof are kept substantially equalized.

While I may employ any suitable means to impart longitudinal movement to the outer tube, I have herein for that purpose represented the inner tube as having a bracket 28 positioned thereabout and secured by a bolt 29. Upon said bracket, which may be of any suitable form, is mounted a rock shaft 30 having fast thereto a pin or spindle 31 provided with a rounded head 32. Upon the outer tube 14 I fixedly position a sleeve 33 having therein an opening 34 of suitable size to receive the rounded head 32 of the spindle or pin 31. By imparting rotary motion to the rock shaft 30, I slide the outer tube 14 upon the inner tube 5, and thereby vary the effective discharge area of the slots of said tubes. While for this purpose I may employ any suitable construction, I have herein represented the rock shaft 30 as having fast thereon an operating lever 34′ herein shown as having pivoted thereto at 35 a link 36, which, as represented in Fig. 5, extends to the confines of the pond so that it may readily be manipulated from such point.

In order to set the lever 34′, I have herein represented it as having an arm 37, the tip 38 whereof is adapted to engage the end of a set screw 39 adjustably mounted in a lug 40 upon the bracket 28. By turning the set screw 39, I limit the movement of the lever 34′. Any other suitable means may, however, be employed to impart relative movement to the tubes 5 and 14.

I have, in Fig. 1, indicated a liquid as being discharged in sheets of spray at 41 and 42, it being understood that the liquid is similarly discharged at the other slots. When the tubes are horizontally positioned, as indicated in Fig. 5, and the form of slots is employed that is represented in Fig. 3, the liquid is discharged in parallel sheets lying in substantially vertical planes, thus permitting air to enter between the planes or sheets of the spray and suitably to commingle therewith and to cool the liquid. This arrangement I consider to be more effective than one wherein the spray is discharged in horizontal sheets, inasmuch as such sheets more or less blanket each other and prevent the thorough action of the air thereon. Within the scope of my invention, however, I may position the tubes otherwise than horizontally, and in Fig. 6, I have represented a plurality thereof as vertically positioned at 43, 44. When the tubes are vertically positioned as indicated in Fig. 6, the slots of said tubes are preferably of the form and extent shown in Fig. 4. In the construction shown in Figs. 1, 2, 3 and 4, the slots 7, 15, etc., are represented as normal to the longitudinal axis of the tubes. I may, however, so cut or otherwise form the slots that they are at an inclination to such longitudinal axes, and in Fig. 7, I have represented suitably inclined slots at 47. In such case, the inner and outer tubes have slots of similar form and preferably of similar extent.

The spraying device shown in Fig. 7 is intended preferably to be used in upright position, so that it will discharge sheets of liquid in upwardly inclined paths between which the air may be admitted so as to effect a cooling action. In this form of my invention, I employ suitable means longitudinally to move one of the tubes with respect to the other. Preferably the outer tube is rendered movable, as in the construction shown in Fig. 1, and I have herein represented substantially the same means for imparting such movement.

In Figs. 8, 9, 10 and 11, I have represented a further modified form of the invention wherein are provided inner and outer tubes 48, 49 respectively, which are relatively rotatable instead of relatively longitudinally movable. Preferably I render the outer tube 49 rotatable upon the inner tube. Said tubes are represented as provided with a suitable number of longitudinally extending slots 50, 51 respectively. In order to impart a movement of rotation to the outer tube 49, I preferably provide the same with a collar 52 having laterally extending therefrom a lug 53 to which is pivotally connected at 54 a rod 55, preferably extending to the confines of the pond and by means of which such movement of rotation may be imparted.

In that form of the invention shown in Figs. 8 to 11, I preferably provide an inner conical member 56 preferably similar in construction and having the function of the conical member 26 shown in Fig. 1.

In that form of the invention shown in Figs. 1 to 7 inclusive, the pressure of the entering liquid upon the closed end of the outer tube tends to move said outer tube longitudinally upon the inner tube, and hence tends to close the slots of said tubes or move them out of register. I preferably provide means whereby the pressure of the entering liquid also tends to close the slots of the tubes shown in Figs. 8 to 11. For this purpose I may employ any suitable means, but preferably I provide the cone 56 with helical vanes 57 preferably of quite steep pitch and so constructed and arranged that the greater component of the pressure of the entering liquid acts tangentially to the said cone, and therefore tends to rotate the same together with the outer tube 49 to which it is secured, so as to close the slots or openings therein. Any other suitable means may be employed both in the construction shown in Figs. 1 to 7 and in the construction shown in Figs. 8 to 11, to impart closing movement to the spray device through the force of pressure of the entering liquid.

I have referred to the link 36 as preferably extending to the confines of the pond, so that it may be readily manipulated from such point. The purpose of the said link or rod is to effect an intermittent flushing of the spraying device. Such intermittent flushing may be effected either automatically or manually, and in any suitable manner. In Fig. 12, I have represented one form of means for effecting such automatic flushing. Therein for the purpose I have indicated one of the spraying devices at 58, it being here shown as of the type represented in Figs. 1 to 7, but if desired it may be of the type represented in Figs. 8 to 11. To the outer tube of the spraying device, to which an axial or longitudinal movement is to be imparted in effecting the flushing action, I suitably connect a rod 59 which extends to the confines of the pond and is there connected to the arm 60 of a bell crank lever pivoted at 61 upon a suitable support and having an arm 62 provided upon its free end with a roller 63 riding upon a cam 64 mounted upon a suitable support 65 and having a slow movement of rotation imparted thereto by worm or other gearing in a suitable manner from a motor 66, which may be an electric, hydraulic or other suitable motor, the construction of which may be widely varied within the scope of my invention.

In Fig. 13, I have represented means for effecting a manual flushing of the spraying device. Therein I have represented the spraying device at 67, it being of the form of the invention shown in Figs. 8 to 11. It may, however, be of the form of the invention shown in Figs. 1 to 7. Therein I have represented the outer tube of the spraying device as having connected thereto a link or rod 68 extending to the confines of the pond and there provided with a handle member 69, an edge whereof is provided with a series of notches 70, any one of which may be placed in engagement with a pin or projection 71 upon a suitable support 72, whereby the rod 68 may be suitably moved to effect the flushing and be held in flushing position the proper length of time. Obviously the flushing may be effected either automatically or manually, whether the tubes of the spraying device have a relative longitudinal movement or have a relative movement of rotation.

It is necessary frequently to flush the spraying device because of clogging and fouling incident to foreign matter in the sprayed liquid. For this purpose, it is important to bring the slots into full register. During the normal operation of the spraying device, however, it is merely necessary to have the slots but slightly or partially overlapped, as indicated most plainly in Fig. 1.

I have referred to the rods 36 as operated either automatically or manually in order to open the slots or openings fully, thereby to effect flushing. When the openings are in full register and flushing of the spraying device is occurring, the pressure of the water or other liquid within the spraying device is reduced to a minimum. It is desirable, therefore, to build up a somewhat increased pressure within the spraying device, either manually or automatically, by means exterior to said spraying device, after which the entering water acts through the longitudinal or rotary movement of one of the members nearly to close the openings or at least to move them out of full register. For this purpose, therefore, the rods 36 are of sufficient stiffness to permit them to be moved either manually or automatically by a motor or otherwise, so as after the flushing operation, partially to close the openings and thus build up the pressure. Thereupon the entering liquid tends further to close said openings and brings them into the desired spraying relation with respect to each other and to hold them therein. By varying the effective discharge area of the slots or openings, I vary the degree of atomization of the sprayed liquid with a given pressure at the source of supply.

From the foregoing description, it will be evident that I have provided a spraying device which is peculiarly applicable in connection with cooling ponds, although I am not limited thereto in its use. In the operation of the device in all the forms shown, the pressure of the liquid tends to close the slots or move them out of register. I preferably employ means for effecting this result, but my invention is not limited or restricted thereto, inasmuch as such feature of my invention may be used together with or separately from other features thereof.

In the form of the invention shown in Figs. 1 to 7, the action of the lever 34 is to open the slots to a greater or less extent and the slots may be retained open to the desired extent by suitable adjustment of the set screw 39. In order to flush the device shown in such form of the invention, it is merely necessary to pull either manually or mechanically upon the links or rods 36, preferably from the confines of the pond for a sufficient length of time to effect the desired purpose. Upon releasing the links 36, the pressure of the liquid tends to close the slots, but they are retained sufficiently open by the set screw 39.

In that form of the invention shown in Figs. 8 to 11, the flushing is effective in a similar manner by the described relative rotation of the tubes, which, as stated, may be effected either mechanically or automatically. If effected automatically, it is obvious that the operating means instead of being located upon the confines of the pond, may be suitably supported in the pond itself above the level of the water and suitably protected from the spray. This is within the scope of my invention.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A liquid spraying device adapted to spray into the atmosphere, comprising a plurality of tube-like, relatively movable members sleeved one upon the other and provided with discharge spraying openings adapted to discharge into the atmosphere, said device having means whereby the liquid entering under pressure tends to position said openings out of register.

2. A liquid spraying device comprising a pair of tube-like members sleeved one upon the other for relative longitudinal movement and provided with discharge openings adapted to be varied in effective discharge area by such longitudinal movement, said tubes having means for equalizing the pressure of the liquid and the distribution thereof through said openings.

3. A liquid spraying device adapted to discharge into the atmosphere comprising a pair of tubes sleeved one upon the other and provided with spraying openings adapted to discharge into the atmosphere, the inner tube having provisions for connecting the same to a source of supply and coöperating means whereby the entering liquid tends to place said openings out of register, and means for moving said outer tube upon the inner tube to vary the effective discharge area of said openings.

4. A liquid spraying device adapted to discharge into the atmosphere comprising a pair of tubes sleeved one upon the other and provided with spraying openings adapted to discharge into the atmosphere, the inner tube having provisions for connecting the same to a source of supply, said outer tube having a closed, outer end against which the entering liquid strikes, and thereby tends to move said openings out of register, and means for setting said outer tube at different positions upon the inner tube to vary the effective discharge area of said openings.

5. A liquid spraying device comprising a pair of tubes sleeved one upon the other and provided with discharge openings, the inner tube having provisions for connecting the same to a source of supply, and means to slide the outer tube longitudinally of the inner tube to vary the effective discharge area of said openings, said tubes having means for equalizing the pressure of the liquid and the distribution thereof through said openings.

6. A liquid spraying device comprising a pair of tubes sleeved one upon the other and each having a series of elongated, segmental, discharge slots therein, and means for sliding one of said tubes upon the other, thereby to vary the effective discharge area of said slots, said device having means whereby the entering liquid under pressure tends to position said openings out of register, and means for equalizing the pressure of the liquid and the distribution thereof through said openings.

7. A liquid spraying device comprising a pair of tubes sleeved one upon the other and each having a series of elongated, segmental, discharge slots therein, said inner tube having provisions for connecting the same to a source of liquid supply, said device having means whereby the liquid entering under pressure tends to position said openings out of register, and means for effecting flushing of said device.

8. A liquid spraying device comprising a pair of tubes sleeved one upon the other and each having a series of elongated, segmental, discharge slots therein, a rock shaft supported upon the inner tube, and means connecting said rock shaft to the outer tube, for effecting longitudinal sliding movement of the latter, thereby to vary the effective discharge area of said slots.

9. A liquid spraying device comprising a pair of tubes sleeved one upon the other and each having a series of elongated, segmental, discharge slots therein, supporting means upon the inner tube, and means connected to said supporting means and operatively connected with the outer tube for imparting longitudinal sliding movement to the latter, thereby to vary the effective discharge area of said slots.

10. A liquid spraying device comprising a pair of tubes sleeved one upon the other and each having a series of elongated, segmental, discharge slots therein, a supporting bracket upon the inner tube, and a lever mounted on said bracket and operatively connected to the outer tube for effecting longitudinal sliding movement of the latter, thereby to vary the effective discharge area of said slots.

11. A liquid spraying device comprising a pair of tubes sleeved one upon the other and each having a series of elongated, segmental, discharge slots therein, a bracket upon said inner tube, a rock shaft supported by said bracket, an operative connection between said rock shaft and said outer tube, and an operating lever upon said rock shaft, thereby to impart longitudinal sliding movement to said outer tube and thus to vary the effective discharge area of said slots.

12. A liquid spraying device comprising a pair of tubes sleeved one upon the other and each having a series of elongated, segmental, discharge slots therein, said inner tube having a bracket, a rock shaft mounted upon the bracket, a collar upon the outer tube, an operative connection between said collar and said rock shaft, and an operating lever mounted upon said rock shaft, thereby to impart longitudinal sliding movement to the outer tube.

13. A liquid spraying device comprising a pair of tubes sleeved one upon the other and each having a series of elongated, segmental, discharge slots therein adapted to be placed in and out of register with each other, a support upon the inner tube, a rock shaft mounted in the support and operatively connected to the outer tube, an operating lever upon said rock shaft, and means for setting said lever.

14. A liquid spraying device comprising a pair of tube-like, relatively movable members and sleeved one upon the other and provided with discharge openings adapted to be placed in and out of register with each other, said tubes having means for equalizing the pressure of the liquid and the distribution thereof through said openings.

15. A liquid spraying device comprising a pair of tube-like, relatively movable members sleeved one upon the other and provided with discharge openings, the inner tube having a conical member extending longitudinally thereof and with the apex directed toward the source of supply, thereby to equalize the pressure of the liquid within the tube and the discharge thereof through said openings.

16. A liquid spraying device comprising two tube-like members sleeved one upon the other and each provided with a series of segmental slots, the inner tube having provisions for connecting it at one end to the source of liquid supply, and the outer tube being closed at the opposite end and having a cone positioned longitudinally therein with the apex directed toward the source of supply.

17. A liquid spraying device for cooling ponds comprising an inner tube adapted to be supported within the contour of the pond and provided with a series of discharge openings, an outer tube having a corresponding series of discharge openings and mounted for sliding movement upon the inner tube, means mounted upon the inner tube and operatively connected with the outer tube for imparting sliding movement to the latter, and a connection from said operating means for imparting such sliding movement from the confines of the pond.

18. A spraying device adapted to discharge or spray into the atmosphere comprising a pair of tube-like members sleeved one upon the other and provided with spraying openings adapted to discharge into the atmosphere, said device having provisions whereby the pressure of the entering liquid tends to place said openings out of register, and means for setting said tubes in opposition to said pressure.

19. A spraying device adapted to discharge or spray into the atmosphere composed of a pair of tube-like members one sleeved upon the other and capable of longitudinal movement thereon, said tubes having spraying openings adapted to discharge into the atmosphere, the outer tube having a closed outer end, the liquid pressure upon which tends to place said openings out of register, and means connected to the outer tube for setting the same in opposition to said pressure.

20. A spraying device composed of a pair of tube-like members sleeved one upon the other and provided with discharge openings, means whereby the extending liquid tends to place the discharge openings out of register, means to set said tubes in opposition to the entering pressure to bring said openings into partial register, and means for effecting flushing of said tubes.

21. A spraying device for cooling ponds composed of a pair of tube-like members supported within the confines of the pond and sleeved one upon the other and having discharge openings, means whereby the entering liquid tends to place the discharge openings out of register, means to set said tubes in opposition to the entering pressure to bring said openings into partial register, and means accessible from the confines of the pond for effecting flushing of said tubes.

22. A spraying device having discharge openings, means whereby the entering pressure tends to close said openings and means connected with said device for effecting an automatic flushing thereof.

23. A spraying device comprising a plurality of members having openings adapted to be positioned by the pressure of the entering liquid in diminishing register for spraying, and means for effecting an automatic flushing of said device.

24. A spraying device comprising a plurality of tube-like members sleeved one upon the other and having discharge openings adapted to be placed in partial register to effect spraying, and automatic means for periodically effecting a flushing thereof by longitudinal movement of one of said tubes along the other.

25. A spraying device comprising a pair of tube-like members sleeved one upon the other and provided with discharge openings, means whereby the entering liquid tends to close said openings, and coöperating means for effecting an automatic flushing of said device.

26. A spraying device adapted to spray into the atmosphere, composed of a pair of members sleeved one upon the other and provided with spraying openings adapted to discharge into the atmosphere, and means whereby the pressure of the entering liquid tends to bring said openings from full register into partial register.

27. A liquid spraying device comprising a pair of tube-like, relatively movable members sleeved one upon the other and provided with discharge openings, the inner tube having tapering means extending longitudinally thereof and with the smaller end directed toward the source of supply, thereby to equalize the pressure of the liquid within the tube and the discharge thereof through said openings.

28. A liquid spraying device comprising tube-like, relatively movable members sleeved one upon the other and provided with discharge openings, and means for gradually reducing the receptive capacity for liquid of the inner tube-like member in the direction of the longitudinal extent thereof.

29. A spraying device comprising tube-like members sleeved one upon the other and provided with discharge openings, means variably to set said tubes in opposition to the pressure of the entering liquid, thereby to bring said openings into partial register, and means for effecting flushing of said tubes.

30. A spraying device adapted to discharge into the atmosphere, composed of a pair of members sleeved one upon the other and provided with discharge openings, spraying into the atmosphere, and means whereby the pressure of the entering liquid tends to move said openings into diminishing register.

31. A liquid spraying device for cooling ponds having a tube-like member positioned within the confines of a cooling pond and adjacent to the surface of the liquid therein, and slotted throughout a substantial portion of its length to permit the issuance of the liquid in sheet form therefrom directly into the atmosphere, the slotted formation being such as to admit the circulation of currents of cooling air between portions of the liquid sheet, means at said member to vary the area of the slotted portion thereof, and operating means extending from said tube-like member and operatively connected to said area-varying means, and accessible from the confines of the pond, thereby to vary the area of said slotted portion of the tube-like member.

32. A liquid-spraying device for cooling-ponds having a tube-like member positioned within the confines of a cooling-pond and adjacent to the surface of the liquid therein and in substantially horizontal position, said device being slotted throughout a substantial portion of its length to permit the issuance of the liquid in sheet form including substantially parallel sheets in substantially vertical planes, directly into the atmosphere, said slotted formation being such as to admit the circulation of currents of cooling air between portions of the liquid sheets, means at said member to vary the area of the slotted portion thereof, and operating means extending from said tube-like member and operatively connected to said area-varying means, and accessible from the confines of the pond, thereby to vary the area of said slotted portions of the tube-like member.

In testimony whereof, I have signed my name to this specification, in the presence of two subscribing witnesses.

LEE H. PARKER.

Witnesses:
ROBERT H. KAMMLER,
IRVING U. TOWNSEND.